United States Patent
Creeden

(10) Patent No.: US 9,360,625 B2
(45) Date of Patent: *Jun. 7, 2016

(54) PUMP ABSORPTION AND EFFICIENCY FOR FIBER LASERS/AMPLIFIERS

(71) Applicant: BAE Systems Information and Electronic Systems Integration Inc., Nashua, NH (US)

(72) Inventor: Daniel J. Creeden, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/534,301

(22) Filed: Nov. 6, 2014

(65) Prior Publication Data

US 2015/0063381 A1    Mar. 5, 2015

Related U.S. Application Data

(63) Continuation of application No. 13/805,359, filed as application No. PCT/US2012/030554 on Mar. 26, 2012, now Pat. No. 8,908,722.

(60) Provisional application No. 61/476,047, filed on Apr. 15, 2011.

(51) Int. Cl.
| | |
|---|---|
| *H01S 3/30* | (2006.01) |
| *G02B 6/26* | (2006.01) |
| *H01S 3/00* | (2006.01) |
| *G02B 6/02* | (2006.01) |
| *H01S 3/067* | (2006.01) |

(Continued)

(52) U.S. Cl.
CPC ......... *G02B 6/262* (2013.01); *G02B 6/02* (2013.01); *H01S 3/005* (2013.01); *H01S 3/06708* (2013.01); *H01S 3/06733* (2013.01); *H01S 3/06754* (2013.01); *H01S 3/094015* (2013.01); *G02B 6/29368* (2013.01); *H01S 3/094007* (2013.01)

(58) Field of Classification Search
CPC .. H01S 3/005; H01S 3/06754; H01S 3/06708
USPC ........................................................ 372/6
See application file for complete search history.

(56) References Cited

U.S. PATENT DOCUMENTS

| | | |
|---|---|---|
| 5,699,466 A | 12/1997 | Uchida et al. |
| 6,347,100 B1 | 2/2002 | Sanders et al. |
| 7,633,621 B2 * | 12/2009 | Thornton ........... A61B 5/14532 356/432 |

(Continued)

*Primary Examiner* — Tuan Nguyen
(74) *Attorney, Agent, or Firm* — Daniel J. Long; Upton & Hatfield LLP; Kimberly A. Peaslee

(57) ABSTRACT

Techniques are disclosed for improving pump absorption and efficiency for fiber lasers and amplifiers, for instance. In some embodiments, the techniques are implemented by applying a partially reflective coating on a fiber end-face to double-pass any unabsorbed or otherwise excess pump light in the cladding of a fiber. While being reflective to pump wavelengths, the coating can be non-reflective at the lasing wavelength, so as to avoid unwanted feedback into the system. The benefits of this approach include that excess pump power can be effectively utilized to add more power to the laser output. In addition, the double-pass technique allows for the use of a shorter fiber length, which in turn allows for more compact system designs, saves on material costs, and facilitates manufacturability.

16 Claims, 4 Drawing Sheets

(51) Int. Cl.
 *H01S 3/094* (2006.01)
 *G02B 6/293* (2006.01)

(56) References Cited

U.S. PATENT DOCUMENTS

| | | |
|---|---|---|
| 7,768,700 B1 | 8/2010 | Savage-Leuchs |
| 7,813,603 B2 | 10/2010 | Nikolajsen |
| 2002/0067886 A1* | 6/2002 | Schaub ............... G02B 6/29365 385/33 |
| 2002/0159736 A1 | 10/2002 | Dejneka et al. |
| 2008/0219624 A1 | 9/2008 | Pimpinella et al. |
| 2009/0080469 A1* | 3/2009 | Nikolajsen ............ G02B 6/2817 372/6 |
| 2009/0159736 A1* | 6/2009 | Asano ................ H01F 41/0633 242/444 |
| 2009/0232453 A1* | 9/2009 | Muendel ................ G02B 6/262 385/43 |

* cited by examiner

PUMP ABSORPTION AND EFFICIENCY FOR FIBER LASERS/AMPLIFIERS

RELATED APPLICATIONS

This application is a continuation of Ser. No. 13/805,359 filed Dec. 19, 2012 which is a 371 of PCT/US/2012/030554 filed Mar. 26, 2012 and claims the benefit of and priority to U.S. Provisional Application No. 61/476,047, filed on Apr. 15, 2011, which is herein incorporated by reference in its entirety.

FIELD OF THE DISCLOSURE

The invention relates to fiber optics, and more particularly, to improving pump absorption and efficiency for fiber lasers and amplifiers.

BACKGROUND OF THE INVENTION

Typically, fiber lasers and amplifiers utilize double-clad fiber for high power pump coupling into the fiber. In doing so, the pump is passed through a length of fiber and 5-10% (or in some cases up to 20% of this pump power is unabsorbed. The intended use of this unabsorbed pump power effectively is to maintain inversion in the fiber throughout its entire length.

SUMMARY

One embodiment of the present invention provides an optical fiber having a fiber core, a first cladding surrounding the core, and an outer cladding surrounding the first cladding, wherein the outer cladding has a lower index of refraction than the first cladding. The optical fiber further includes a partial reflector applied to a fiber-to-free-space interface associated with the fiber, wherein the partial reflector is reflective at pump light wavelengths and antireflective at core light wavelengths. In some cases, the partial reflector is configured to double-pass any unabsorbed pump light back through the first cladding. In some cases, the length of the optical fiber is determined based on optimal double-pass absorption of pump light. In some cases, the partial reflector is applied to a tip of the optical fiber. In some cases, a tip of the optical fiber is coated in the partial reflector. In some cases, the partial reflector is applied to a tip of the optical fiber using a fiber connector, and connectorization adhesive does not strip cladding light or intervene between the partial reflector and the tip of the optical fiber. In some cases, the partial reflector is nonmetallic. Numerous variations will be apparent in light of this disclosure. For instance, another embodiment provides a fiber laser or a fiber amplifier comprising the optical fiber as variously defined in this paragraph.

Another embodiment of the present invention provides a method of optimizing an optical fiber system comprising. The method includes determining a pump light power, determining a fiber length for an optical fiber, and providing an optical fiber having an end with a partial reflector applied thereto, wherein the partial reflector is reflective at pump light wavelengths and antireflective at core light wavelengths. The method further includes reflecting unabsorbed pomp light through a cladding of the optical fiber. In some cases, determining a pump light power comprises determining a pump power for optimal double-pass absorption of pump light through a given fiber length. In some cases, determining a fiber length comprises determining a fiber length for optimal double-pass absorption of pump light of a given power. In some eases, the partial reflector is coated on a tip of the optical fiber. In some eases, providing an optical fiber having an end with a partial reflector applied thereto comprises connectorizing the optical fiber with a partially reflective connector and connectorization adhesive does not strip cladding light or intervene between the partial reflector and tip of the optical fiber. In some cases, the optical fiber is a fiber laser or a fiber amplifier. In some cases, providing an optical fiber having an end with a partial reflector applied thereto comprises applying a nonmetallic partial reflector to a tip of the optical fiber.

Another embodiment of the present invention provides an apparatus that includes a connector for connectorizing double clad optical fibers, and a partial reflector incorporated within the connector, wherein the partial reflector is reflective at pump light wavelengths and antireflective at core light wavelengths. In some cases, the partial reflector is configured to reflect unabsorbed pump light through an inner cladding of a double clad optical fiber. In some cases, the partial reflector is nonmetallic. In some cases, the connector adhere to an optical fiber such that connectorization adhesive does not strip inner cladding light or intervene between the partial reflector and tip of the optical fiber. In some cases, the connecter is configured to adhere to a fiber laser or a fiber amplifier.

The features and advantages described herein are not all-inclusive and, in particular many additional features and advantages will he apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
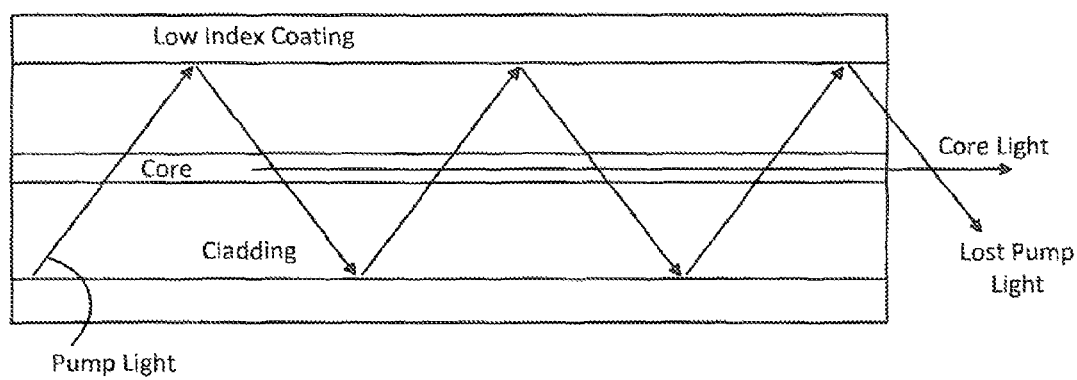
FIG. 1 illustrates a cross-sectional side view of a typical double-clad fiber.

Techniques are disclosed for improving pump absorption and efficiency for fiber lasers and amplifiers. In some embodiments, the techniques are implemented by applying a highly reflective coating on a fiber end-face to double-pass any unabsorbed or otherwise excess pump light in the cladding of a fiber laser. While being reflective to pump wavelengths, the coating can be non-reflective at the lasing wavelength, so as to avoid unwanted feedback into the system. Such a partial reflector can be deposited on a fiber end-face, compressed against a fiber tip along with a fiber connector, or otherwise applied to an optical fiber. The benefits of this approach is that excess pump power, which is usually wasted or otherwise ignored, can be effectively utilized to add more power to the laser output. In addition, the double-pass technique allows for the use of a shorter fiber length, which in turn allows for more compact system designs as well as saves on material costs and facilitates manufacturability.

General Overview

As previously explained, the intended use of unabsorbed pump power in the cladding of a fiber laser/amplifier system is to maintain inversion in the fiber throughout its entire length. For instance, typical three-level fiber lasers or amplifiers (Er, Er:Yb, Tm, Ho, Yb) require that some pump be unused or unabsorbed) in the fiber to avoid ground-state absorption losses. By optimizing the fiber length to absorb 90-95% of the pump power, high laser/amplifier system efficiencies can be achieved, but this unused pump power is wasted and also can generate unnecessary heat. Also because of the unabsorbed pump power, actual efficiencies of the fiber laser/amplifier system are lower than they could be if the unabsorbed pump energy was utilized.

To overcome this waste of unused optical pump power, and in accordance with an embodiment of the present invention, the pump light propagating in the cladding may be double-passed in the laser/amplifier using the same fiber length (or even a shorter fiber length) than would typically be used in a conventional single-pass system. In one such embodiment, double-passing of the pump light propagating in the cladding is achieved by coating the output fiber tip of the laser to be reflective at the pump wavelength, while remaining antireflective at the lasing wavelength.

Of further consideration, in a three-level laser, there is a loss at the laser wavelength in the gain material when the gain material is unpumped (or not pumped hard enough). This precludes increasing the fiber length to get more pump absorption, as the longer fiber length will add loss, not gain. Shorter fiber length means that the loss is lower and thus the laser threshold is lower. As will be appreciated in light of this disclosure, a benefit of the present invention configured in accordance with some embodiments is that shorter fiber lengths are enabled which in turn enables the fiber laser/amplifier system to be more efficient (due to a lower threshold) and will emit more power than a conventional non-double-passed fiber laser/amplifier system.

Thus, the coated fiber tip allows the fiber laser performance to be significantly improved, without modifying the fiber dopants and without the use of other external optical components. By taking advantage of a coated tip, the laser itself can he optimized and performance can be enhanced.

Fiber with Selective Reflector for Double-Pass Operation

FIG. 1 illustrates a cross-sectional side view of a typical double-clad fiber being used a conventional single pass configuration. As can be seen, the fiber includes a core surrounded by a cladding. The cladding is covered by a low index coating (effectively, an outer cladding), which is an acrylate coating in one example case. The core and cladding materials can also be implemented with conventional materials as commonly done. Other suitable fiber types will be apparent in light of this disclosure.

The light propagating in the fiber generally may include both core light (light is propagating in the core) and cladding light (light is propagating in the cladding). The light shown propagating in the cladding can be, for example, unused or otherwise excess pump light, or a combination of both unused pump light and leaked core light (e.g., leaks due to fiber splices).

In any case, the cladding light is waveguided or otherwise contained within the fiber due to the low index of the outer coating. The unabsorbed pump light that reaches the end of the fiber exits the fiber as lost pump light shown in FIG. 1. In one example case, about 20% of the cladding pump signal is lost at the end of the fiber. At high power, 20% loss can be a significant waste of power. The effective pump absorption for this example case is about 5 dB/m, for as fiber length of about 1.8 meters. The overall pump light absorption is about 9 dB.

Figure 2:
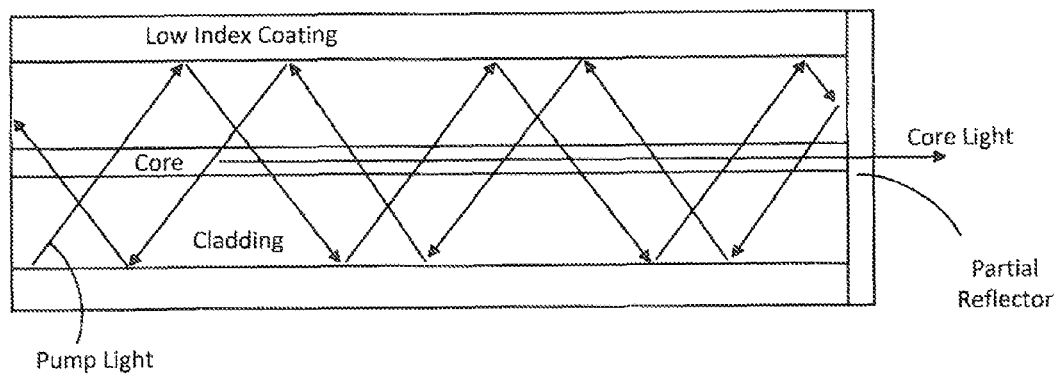
FIG. 2 illustrates a cross-sectional side view of a double-clad fiber configured with a partial reflector, in accordance with an embodiment of the present invention.

FIG. 2 illustrates a cross-sectional side view of a double-clad fiber configured for a double-pass configuration, in accordance with an embodiment of the present invention. As can be seen, the fiber may be configured in a similar fashion as the fiber shown in FIG. 1. However, by applying a thin-film or other type of partial reflector on the fiber end-face, the pump can be double-passed resulting in more pump absorption in the fiber, higher output power, and increased overall efficiency.

In one example case, the partial reflector is highly reflective (e.g., >99.5% reflective) at the pump wavelength, and may further be configured to be antireflective at the core signal wavelength. As shown, core light is allowed to pass through the partial reflector. The pump light and core light are generally at different wavelengths, and therefore each of these optical signals can be selected for reflection or antireflection as desired. Thus any leaked core light (e.g., due to splice losses) propagating in the cladding will not be reflected. In addition, the effective pump absorption for one example case is about 5 dB/m, for a fiber length of about 1.8 meters.

However, given the double-pass configuration, the overall pump light absorption may be about 18 dB (which is about eight times as high as the example single pass configuration shown in FIG. 1). In one embodiment, only a small amount of pump signal is wasted at the fiber output (e.g., <0.5%) because the partial reflector is highly reflective at the pump wavelength. In another embodiment, at the pump input only a small percentage of the overall pump signal remains unused after the second pass through the fiber (e.g., <2% unabsorbed pump light, in this example case).

Note that the highly reflective coating does not have to be applied at the output of the fiber laser system, in other embodiments, for example, it can be included at any fiber-to-free-space interface. This may become useful, for instance, in a multi-stage amplifier system with inter-stage isolation or amplified spontaneous emission (ASE) filtering, For example, if the gain fiber is directly connected to an optical isolator, the input fiber to the isolator may be coated to reflect the pump light.

In some embodiments, to be suitably anti-reflective, the coating on the fiber tip is non-metallic, as a metallic coating may reflect the laser light as well, depending on the lasing wavelength. As will be appreciated, the coating can be implemented with different types of materials depending on factors such as the substrate material (surface being coated, or fiber tip in this case) and the wavelength range of interest. Thus, in some example embodiments, a thin film coating is engineered (e.g., based on materials, thickness, and number of layers) to provide reflection at one wavelength and transmission at another wavelength. Example non-metallic coating materials include, for instance, magnesium fluoride, calcium fluoride, thorium fluoride, zinc sulfide, titanium dioxide, and silicon dioxide. In a more general sense, the coating can be implemented with any suitable dielectric material or material system, that is geared to a given application (e.g., with respect to wavelength range to be reflected, wavelengths to be passed, and power levels of each signal involved).

As will further be appreciated in light of this disclosure, this technique can be repeated for various configurations or multiple times in the same system if a cascaded amplifier chain is used. Embodiments of the present invention could also be implemented, for example, in a counter-pumped system.

Figure 3A:
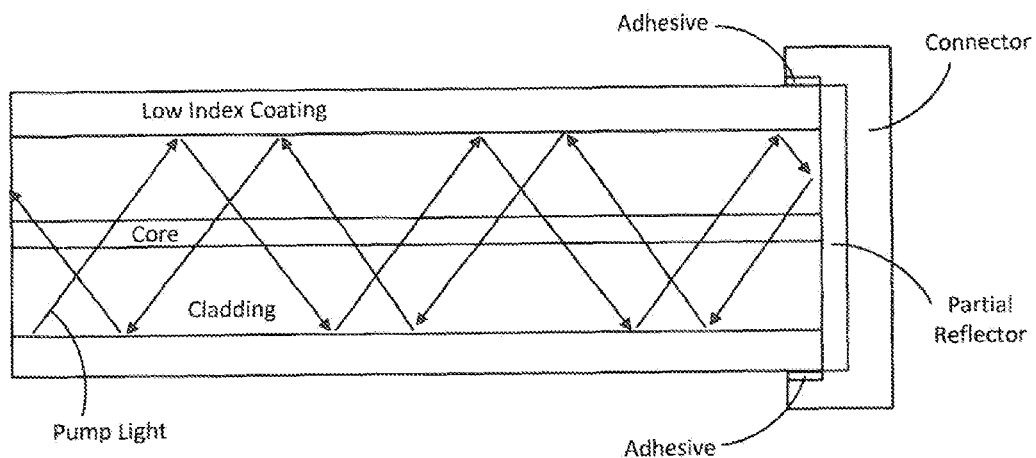
FIGS. 3a-b each illustrates a cross-sectional side view of a double-clad filter configured with a partial reflector and a fiber connector, in accordance with an embodiment of the present invention.
Figure 3B:
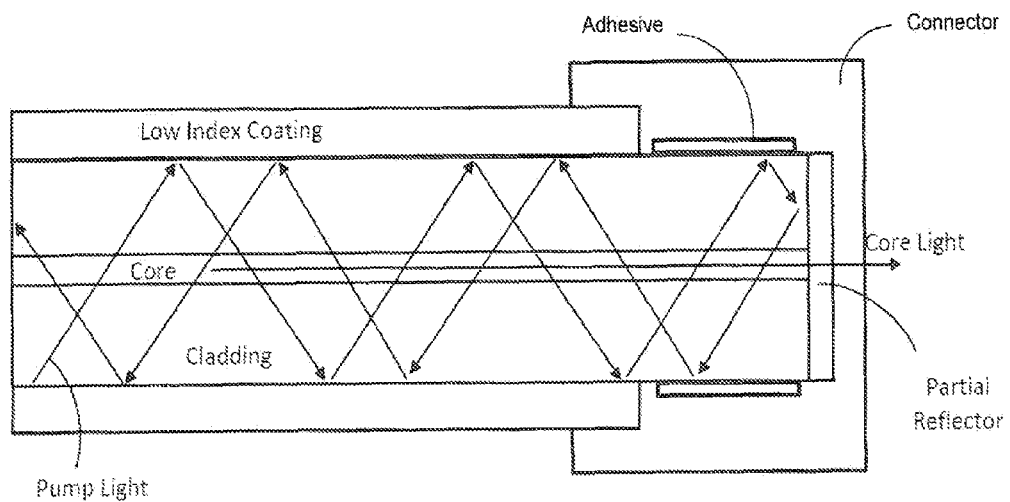

Referring to FIG. 3a, a cross sectional side view of one embodiment is shown wherein the fiber tip is connectorized. A fiber connector may be applied to the optical fiber using clamps, screws, or other suitable adhesives. If a partially reflective coating is applied to the fiber tip, as shown in FIG. 3a, the fiber may be bonded into the connector without the adhesive contacting the fiber cladding or tip. In such embodiments, the adhesive is only in contact with the connector and the fiber's low index coating, allowing for reflection of pump light and preventing damage to the fiber or the connector. In addition. the coating of the fiber tip allows the system to he monolithic, and external components are not required, which enhances reliability and practicality. In other embodiments, low index adhesive can be used when connectorizing the fiber, which is particularly useful when the given connectorizing process involves removal of the outer cladding (e.g., acrylate), and the adhesive is placed in contact with the inner cladding and the connector, as shown in the example embodiment of FIG. 3b. In such embodiments, if a high index adhesive is used, the connector will act as a cladding stripper and could cause overheating problems and/or damage the connector. Thus, to prevent this, and in accordance with one example embodiment, a low index adhesive can be used. Example connectors that can be used in the connectorizing process include, for instance, FC, SMA-905, LD-80, or other such commonly used and suitable connectors. There are numerous such fiber connectors commercially available.

According to another embodiment of the present invention, the partial reflector may be integrated into a connector, such that the partial reflector is applied to the fiber tip by application of a connector. Such an application may allow a fiber cable to be cut at any desired length and connectorized with a partially reflective connector. The previous discussion with respect to the connectorizing adhesive note contacting the fiber cladding or tip is equally applicable here.

Double-passing the pump via applying a partial reflector to the fiber tip in accordance with an embodiment of the present invention allows the pump light to be reflected back into the doped fiber length so it can be nearly completely absorbed. For the same fiber length as a conventional single-pass laser, almost all of the pump power can be absorbed, resulting in a reduced lasing threshold, higher output power, and higher efficiency for the same amount of pump power. Another advantage is that the fiber length can actually be shortened (while simultaneously maintaining high pump absorption) to further reduce fiber losses and increase nonlinear thresholds in the fiber.

Figure 4:
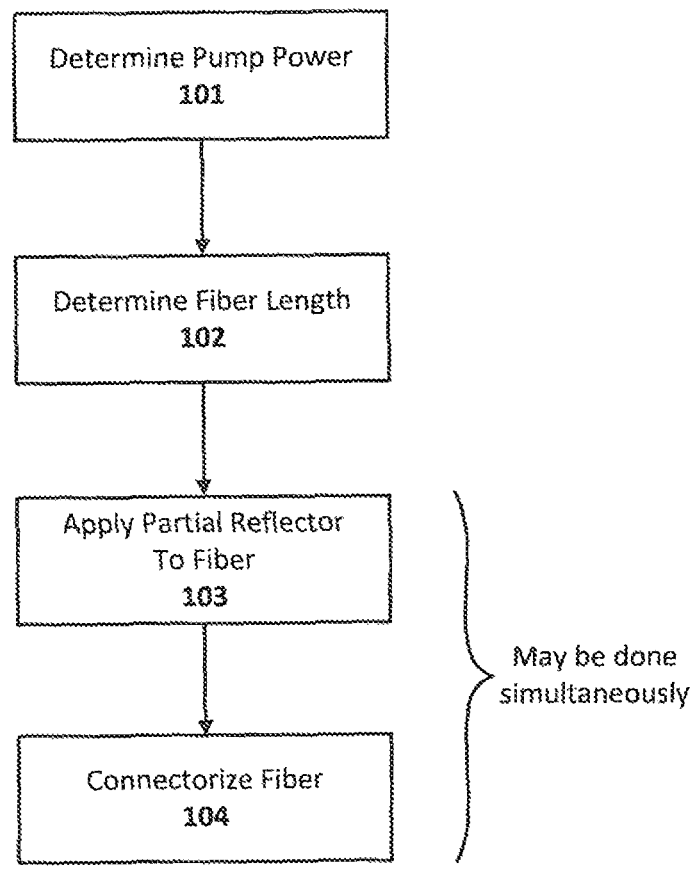
FIG. 4 illustrates a method of optimizing an optical fiber, in accordance with an embodiment of the present invention.

Referring to FIG. 4, a method of optimizing a fiber laser or fiber amplifier is illustrated, according to one embodiment of the present invention. The appropriate pump light power may be determined 101 based on the fiber length, the pump diode being used, or other factors. The fiber length may be determined 102 based on optimal double pass absorption of a given pump light power, the length of the fiber application, or other factors. In one embodiment of the present invention, the fiber length may be predetermined, and the pump power may be determined 101 based on optimal double-pass absorption through the given fiber length. A partial reflector may be applied 103 to the fiber tip. According to one embodiment, the partial reflector is designed to reflect light at the pump light wavelength and transmit light at the core light wavelength. In another embodiment, the partial reflector may be coated onto the fiber tip. In another embodiment, the partial reflector may be applied to the fiber tip via a connector, as described above in reference to FIGS. 3a-b. The fiber may also be connectorized 104. In one embodiment, the fiber may be connectorized such that the adhesive used in the connectorization does not contact the fiber tip or cladding, but only contacts the low index coating of the fiber. In or more general sense, the adhesive should not strip out cladding light or otherwise intervene between the cladding light and the partial reflector. Note, however, that the adhesive can contact the partial reflector on an outer surface of the partial reflector (i.e., surface of the partial reflector that is not initially impinged upon by cladding light) without damaging the fiber or causing heating problems. In one embodiment, the partial reflector may be implemented into the connector, allowing the application of the fiber reflector 103 and the connectorization 104 to be performed simultaneously.

Cladding strippers can be used in some fiber laser applications to prevent excess pump light from exiting the fiber tip. In high power systems, however, cladding strippers can get very hot, requiring significant cooling. By partially reflecting pump light in accordance with an embodiment of the present invention, cladding strippers may be eliminated, reducing the number of elements in a fiber laser/amplifier, and reducing the cooling requirements of the fiber system. This can further simplify at fiber laser/amplifier architecture.

Fiber Laser/Amplifier Systems

Typically, fiber laser/amplifier systems utilize double-clad fibers to allow for efficient coupling, of pump light into the highly multimode cladding. The claddings can range in diameter, for example, from 125 microns up to 400 microns, or even larger, depending on the fiber geometry, with numerical apertures, for instance, of greater than 0.46. In these fibers, only the cores are doped with rare-earth ions. As the pump light propagates along the fiber, it gets absorbed as it passes through the core, inverting the ions in the core (this is generally an exponential absorption which follows Beer's law).

In three-level fiber systems such as those that include Yb, Er, Er:Yb, Tm, and Ho dopants), the lasing wavelength tends to have ground-state losses in the fiber core. This means that as a signal propagates in the core, if there is no pump present, the active ions will absorb the signal power, resulting in a loss. In order to overcome this loss to achieve gain, the fiber must be pumped. at an appropriate wavelength (depending on the dopant), providing gain to this signal.

When the pump is high enough and enough ions are inverted, the gain will exceed the loss and lasing or amplification can occur in the fiber core. Eventually, given a sufficient length of fiber, once all the pump is absorbed (or a large percentage of it), the loss will once again exceed the gain, resulting in losses. To mitigate these losses, the fiber can be kept short enough such that the lasing signal sees gain throughout the entire length of the fiber. In some example cases, depending on the lasing, wavelength and the fiber composition, between 5-20% of the pump can remain unabsorbed, but the system provides the optimum gain for the lasing signal. If a longer fiber length was used, more pump would get absorbed, but the inversion will not be high enough in that length, so only loss would occur in the longer section. This is called a single-pass configuration. As a result of this unabsorbed pump power, the overall laser system efficiency is effectively reduced because pump light is essentially wasted. Double-passing the pump for the same fiber length as a single-pass configuration, and in accordance with an embodiment of the present invention, allows for more of this pump to be used, resulting in higher output power and efficiency from the system. This is particularly beneficial, for example, in three-level laser systems.

As will be appreciated in light of this disclosure, embodiments of the present invention implement an effective way to reflect the unabsorbed pump hack into the fiber. Since the pump propagates through the cladding, traditional fiber Bragg gratings cannot be used, as the cladding is highly multimode. However, light must eventually exit the fiber to be used. At this exit interface (or at a component interface), and in accordance with one example embodiment, a reflective coating is applied to the flat or angled fiber end-face. This coating can be highly reflective (e.g., >99.5% reflection) at the pump wavelength, thereby allowing the pump signal to bounce off the interface and propagate backwards through the fiber. The coating may also be antireflective for the lasing wavelength (e.g., <1% reflection) such that no signal is lost as a result.

This double-pass technique provided herein has several advantages to a conventional single-pass approach. One advantage is that it allows for high overall efficiency, as more of the pump can be used. Another advantage is that it can allow for the use of a shorter fiber. Since the pump is passing through the fiber twice, the fiber length can be reduced so that most of the pump can be absorbed in a shorter overall length. This can lower the laser threshold (as losses are lower), but it also increases nonlinear thresholds in the fiber, as the length is shorter. Most nonlinear processes such as stimulated raman scattering (SRS), stimulated brillouin scattering (SBS), four-wave mixing (FWM), self-phase modulation (SPM), cross-phase modulation (XPM), etc) in a fiber are length dependent, so as the fiber gets longer, the various nonlinear thresholds lower, and less power can be achieved from the fiber. In accordance with an embodiment of the present invention, the fiber length can be decreased without requiring a different fiber concentration or geometry, but while still maintaining high pump light absorption, so overall gain and output power can be maintained or increased without hitting these nonlinear thresholds.

For example, in a Tm-doped fiber laser operating at 1908 nm, the ground-state absorption at 1908 nm is very high, requiring a relatively short fiber length. For typical Tm-doped fibers, this length allows, for example, about 9 dB (~87%) of pump absorption. More pump absorption (with a longer fiber length) would result in lower output power. If the laser is being pumped at 790 nm with 50 W of power, then 6.5 W of pump is unused. If this laser generates 21.75 W of 1908 nm power, then the optical efficiency for a single-pass configuration is 43.5% (21.75 W of output for 50 W of pump, with only 43.5 W being absorbed). By double-passing the pump in accordance with an embodiment of the present invention, 98% (18 dB) of the pump can be absorbed, which would result in 24.5 W of output power, resulting in an optical efficiency of about 49% (24.5 W of laser output power for 50 W of pump, with 49 W begin absorbed).

Basically by double-passing the pump and using the additional 6.5 W, for the same electrical drive power on the pump diode, it is possible to extract more power from the laser. This double-passing pump technique can drastically improve system efficiency by utilizing pump light which would otherwise be discarded. As will be further appreciated as pump powers increase, the benefit becomes greater, as even more pump would be wasted in a single-pass configuration.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An optical fiber comprising:
    a fiber core;
    a first cladding surrounding the core; and
    a partial reflector applied to a fiber-to-free-space interface associated with the fiber, wherein the partial reflector is reflective at pump light wavelengths and antireflective at core light wavelengths, wherein the partial reflector is nonmetallic and is applied to a tip of the optical fiber using a fiber connector, and connectorization adhesive does not strip cladding light or intervene between the partial reflector and the tip of the optical fiber.

2. The optical fiber of claim 1, wherein the partial reflector is configured to double-pass any unabsorbed pump light back through the first cladding.

3. The optical fiber of claim 2, wherein the length of the optical fiber is determined based on optimal double-pass absorption of pump light.

4. The optical fiber of claim 1, wherein a tip of the optical fiber is coated by the partial reflector.

5. A fiber laser or a fiber amplifier comprising the optical fiber of claim 1.

6. The optical fiber of claim 1, further comprising an outer cladding surrounding the first cladding, wherein the outer cladding has a lower index of refraction than the first cladding.

7. A method of optimizing an optical fiber system comprising:
    determining a pump light power;
    determining a fiber length for an optical fiber;
    providing an optical fiber having an end with a partial reflector applied thereto, wherein the partial reflector is reflective at pump light wavelengths and antireflective at core light wavelengths;
    connectorizing the optical fiber with a partially reflective connector and connectorization adhesive does not strip cladding light or intervene between the partial reflector and tip of the optical fiber; and
    reflecting unabsorbed pump light through a cladding of the optical fiber.

8. The method of claim 7, wherein determining a pump light power comprises determining a pump power for optimal double-pass absorption of pump light through a given fiber length.

9. The method of claim 7, wherein determining a fiber length comprises determining a fiber length for optimal double-pass absorption of pump light of a given power.

10. The method of claim 7, wherein the partial reflector is coated on a tip of the optical fiber.

11. The method of claim 7, wherein the optical fiber is a fiber laser or a fiber amplifier.

12. The method of claim 7, wherein providing an optical fiber having an end with a partial reflector applied thereto comprises applying a nonmetallic partial reflector In a tip of the optical fiber.

13. An apparatus comprising:
    a connector for connectorizing double clad optical fibers; and
    a partial reflector incorporated within the connector, wherein the partial reflector is reflective at pump light wavelengths and antireflective at core light wavelengths and the connector is configured to adhere to an optical fiber such that connectorization adhesive does not strip inner cladding light or intervene between the partial reflector and tip of the optical fiber.

14. The apparatus of claim 13, wherein the partial reflector is configured to reflect unabsorbed pump light through an inner cladding of a double clad optical fiber.

15. The apparatus of claim 13, wherein the partial reflector is nonmetallic.

16. The apparatus of any of claim 13, wherein the connector is configured to adhere to a fiber laser or a fiber amplifier.

* * * * *